(12) United States Patent
Gleason

(10) Patent No.: US 7,162,762 B1
(45) Date of Patent: Jan. 16, 2007

(54) DOCK LEVELER WITH INFLATABLE BAG

(75) Inventor: Denis Gleason, Bowmanville (CA)

(73) Assignee: Nordock, Inc., Port Hope (CA)

( * ) Notice: Subject to any disclaimer, the term of this patent is extended or adjusted under 35 U.S.C. 154(b) by 0 days.

(21) Appl. No.: 11/445,689

(22) Filed: Jun. 2, 2006

(51) Int. Cl.
*E01D 1/00* (2006.01)

(52) U.S. Cl. ........................................... 14/71.3

(58) Field of Classification Search ................. 14/69.5, 14/71.1, 71.3
See application file for complete search history.

(56) References Cited

U.S. PATENT DOCUMENTS

| | | | | |
|---|---|---|---|---|
| 4,293,969 A | * | 10/1981 | Frommelt | 14/71.1 |
| 4,365,374 A | | 12/1982 | Bennett | 14/71.7 |
| 4,641,388 A | | 2/1987 | Bennett | 14/71.7 |
| 5,042,103 A | | 8/1991 | Megens | 14/71.7 |
| 5,446,938 A | | 9/1995 | Warner | 14/71.3 |
| 5,471,693 A | | 12/1995 | Hodges | 14/71.3 |
| 5,481,774 A | | 1/1996 | Hodges | 14/71.7 |
| 5,500,968 A | | 3/1996 | Hodges | 14/71.7 |
| 5,522,107 A | | 6/1996 | Hageman | 14/69.5 |
| 5,522,108 A | * | 6/1996 | Massey et al. | 14/71.7 |
| 5,600,859 A | * | 2/1997 | Hodges et al. | 14/71.1 |
| 5,802,650 A | * | 9/1998 | Massey et al. | 14/71.3 |
| 5,802,651 A | * | 9/1998 | Massey et al. | 14/71.3 |
| 5,996,156 A | * | 12/1999 | Massey | 14/71.3 |
| 6,216,303 B1 | * | 4/2001 | Massey | 14/71.3 |
| 6,240,587 B1 | * | 6/2001 | Meichtry et al. | 14/69.5 |
| 6,360,393 B1 | * | 3/2002 | Fritz | 14/69.5 |
| 6,834,409 B1 | | 12/2004 | Gleason | 14/71.3 |
| 6,918,575 B1 | * | 7/2005 | Cadrain et al. | 254/88 |
| 7,062,814 B1 | * | 6/2006 | Bender et al. | 14/71.3 |
| 2003/0204921 A1 | | 11/2003 | Bender | 14/71.3 |

* cited by examiner

*Primary Examiner*—Gary S. Hartmann
(74) *Attorney, Agent, or Firm*—Jeffrey S. Sokol; Cook & Franke S.C.

(57) ABSTRACT

An air operated dock leveler is provided to selectively raise and lower a deck with an extendable lip. The deck includes a downwardly extending deck lift arm. An air lift assembly includes a single chamber, inflatable bag positioned between a stationary lower bag support and movable upper platform. A pull line is secured to the platform and the deck lift arm. When actuated, a blower inflates the bag and raises the platform. The pull line pulls the deck lift arm forward and raises the deck to an inclined position. When the blower is turned off, the ramp descends until the now extended lip engages the bed of a truck. After loading or unloading the trailer, the bag is reinflated to raise the ramp and retract the lip. The blower is then turned off, and the ramp descends to its stored position.

20 Claims, 7 Drawing Sheets

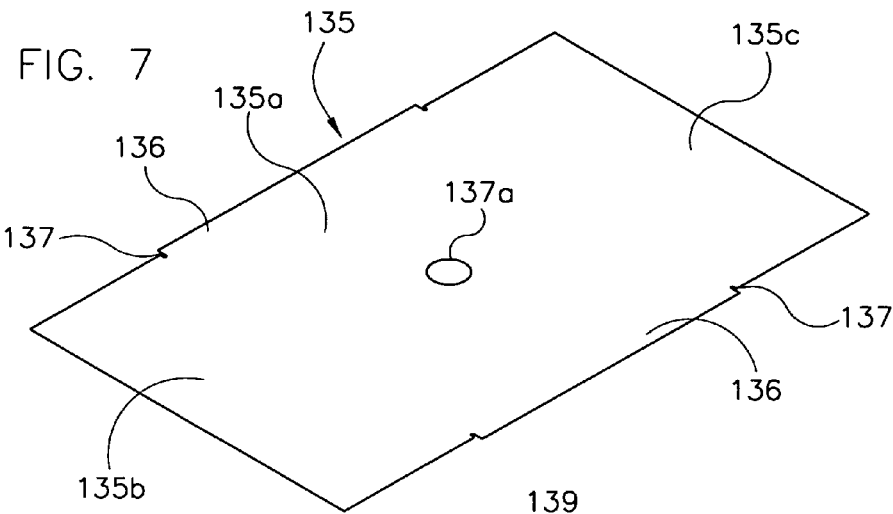
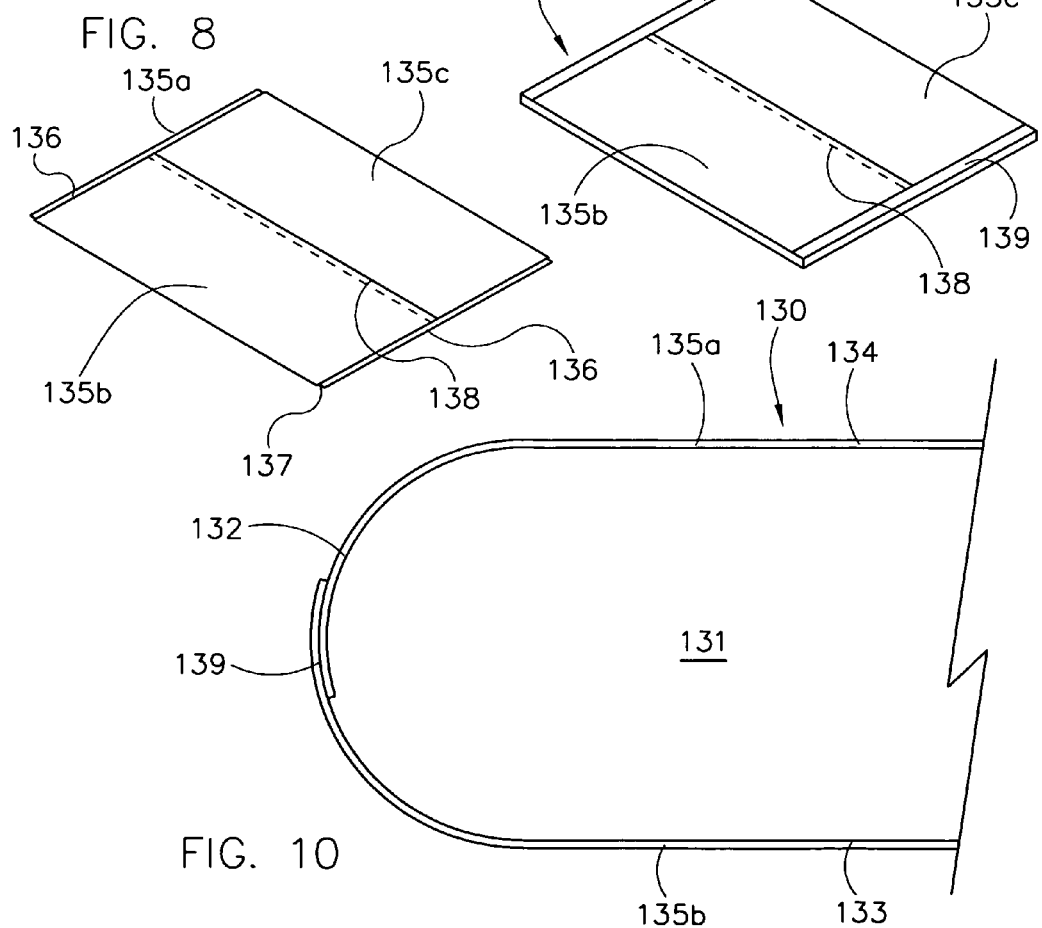

DOCK LEVELER WITH INFLATABLE BAG

TECHNICAL FIELD OF THE INVENTION

This invention relates to a dock leveler with a deck lift assembly having an inflatable air bag to raise and lower the deck.

BACKGROUND OF THE INVENTION

Dock levelers are utilized in the transfer of goods between a building and a trailer by bridging the gap from the building floor to the trailer bed. Dock levelers include a frame or support structure for mounting the leveler in a pit of a loading dock. The rear end of a conventional dock leveler is hinged to the building floor. The opposite end has an extendable lip plate that pivots out and onto the trailer bed. Levelers are adapted to move from a generally horizontal position where the upper surface of the ramp is flush with the surface of the building floor to a second generally inclined position to provide a ramp between the bed of the truck and the dock floor.

Conventional methods of lifting the dock leveler use springs, hydraulics, and more recently low pressure air. All methods are utilized to raise the ramp assembly from a generally horizontal dock level position to an upwardly inclined position to allow the extension of a hinged lip assembly above the bed of a truck to allow lowering onto the truck. In the case of the air powered dock leveler the operator typically pushes and holds a control button until the ramp is fully raised. The lip can either extend before the ramp is fully raised or is extended as the ramp descends. Various mechanisms are used to extend the lip. By releasing the control button, the operator allows the ramp to lower under gravity. As the ramp lowers, the lip remains extended until unlatched by the bed of the truck or is retracted in a controlled manner as it enters the loading zone height. The truck supports one end of the leveler. Goods are then transferred between the building and the truck utilizing the ramp. After the trailer is loaded or unloaded, the operator pushes the control button to raise the ramp until the lip retracts to a pendent position. The operator then releases the button to allow the dock leveler to drop down to its stored position, which is level with the building floor.

Hydraulic dock levelers can be efficient, but are generally more costly to purchase and service. They are also prone to fluid leaks. Examples of hydraulically operated dock levelers are shown in U.S. Pat. Nos. 4,365,374 and 4,641,388. Spring powered dock levelers are often less costly, but have many high wear components and are more difficult to operate. Because the spring continuously biases the ramp toward a raised position, a hold down device is needed to hold the ramp at a desired stored or truck engaging position. Each time the operator wants to raise the ramp, he or she has to bend over to reach a hold down release that is typically located slightly below the floor. Once the ramp rises, the operator has to walk on the inclined ramp to overcome the force of the spring and lower the ramp down onto the truck or into its stored position.

Low pressure air powered dock levelers are generally less costly than hydraulic units and easier to operate than spring powered levelers. Examples of this type of leveler are shown in U.S. Pat. Nos. 5,042,103, 5,446,938, 5,471,693 and 5,500,968 and U.S. Publication No. 2003/0204921. These levelers include an inflatable bag or column. One problem with these designs is that they require bags with multiple sections and complex methods of construction that increases material, manufacturing and assembly cost, as well as increase friction between parts and the potential for rupture or failure. Another problem is that other components rub against the bag during operation. This rubbing or friction causes wear that leads to leaks in the bag or its rupture. This friction results from the movement of the bag to accommodate the arced movement of the ramp relative to the pit floor or support pan. Another problem with these designs is that they rely on the pit floor to form the bottom support for the bag, which requires complex installation and shipping methods, particularly to protect the bag from damage.

The present invention is intended to solve these and other problems.

BRIEF DESCRIPTION OF THE INVENTION

The present invention pertains to a dock leveler with a frame secured in a pit of a loading dock. A ramp assembly is pivotally mounted to the frame. The ramp assembly includes a lip assembly hingedly connected to the front edge portion of the ramp. A lift assembly includes an air bag attached to an upper pan assembly and supported by a bottom pan attached to the frame. A blower assembly is mounted to the upper pan assembly. When the blower is actuated, it pushes a volume of air into the bag at a pressure sufficient to raise the ramp assembly from a stored substantially horizontal position to an inclined position relative to a parked vehicle. Chains or cables connected to each side of the upper pan assembly are routed around sprockets or pulleys that are pinned to the frame. The chains are connected to a tension arm attached to a lift arm at the rear of the ramp assembly. A spring is connected to the tension arm to maintain the chain in constant tension when the bag is deflated and the lip rests on a trailer, or when the deck is supported with a maintenance stand. The lift assembly has a positive stop at an uppermost inclined position. When the ramp assembly approaches or reaches its uppermost inclined position, the lip extension mechanism is engaged. When the operation of the blower is discontinued, the weight of the ramp assembly pulls the upper pan down to deflate the bag, so that the ramp descends until the lip contacts the bed of a vehicle. When the blower is reactivated, the ramp assembly rises, retracting the lip assembly from the truck bed. Discontinuing the blower after the lip assembly retracts, allows the dock leveler to descend to its stored position.

It is a general object of the invention to provide an improved method of utilizing an air bag to lift a dock leveler ramp assembly.

It is another object of the invention to have an improved bag construction that is simple in design and requires only one chamber.

It is another object of the invention that the bag assembly when inflated moves predominantly in a vertical direction while moving the ramp assembly towards an inclined raised position.

It is another object of the invention that the bag assembly or support pan assembly be an integral rigid part of the frame assembly and not pivot, roll or otherwise push onto a building pit floor, therefore allowing full operation in a self contained system.

It is another object of the invention that the pan or bag assembly be raised by a chain or cable in tension from the frame assembly to the rear of the ramp assembly.

It is another object of the invention that a maximum travel stop shall limit the upward movement of the ramp assembly.

It is another object of the invention that the dock leveler can be shipped without the need for the bag or pan assemblies to be tied or otherwise fastened in a raised position.

It is another object of the invention that the bag or pan assemblies not require unfastening or assembly during installation.

It is another object of the invention that the blower assembly be easily accessible for service or replacement without the need to remove the bag or pan assemblies.

Other aspects and advantages of the invention will become apparent upon making reference to the specification, claims and drawings.

BRIEF DESCRIPTION OF THE DRAWINGS

FIG. 7 is a perspective view of a single reinforced vinyl sheet used to form the inflatable bag.

FIG. 8 is a perspective view of the vinyl sheet with its two side sections folded over its central section, the central section forming a first layer and the side sections forming a second layer, the second layer having a central lateral overlap area that is integrally joined to from a central lateral seam.

FIG. 9 is a perspective view of the vinyl sheet with two outer lap portions of the central section folded over and integrally joined to the second layer to form two longitudinal seams.

FIG. 10 is a partial, side sectional view of the inflatable bag in its inflated state showing the overlapping structure of one of the longitudinal seams.

DESCRIPTION OF THE PREFERRED EMBODIMENTS

While this invention is susceptible of embodiment in many different forms, the drawings and photographs show and the specification describes in detail preferred embodiments of the invention. It should be understood that the drawings and specification are to be considered an exemplification of the principles of the invention. They are not intended to limit the broad aspects of the invention to the embodiments illustrated.

Figure 1:
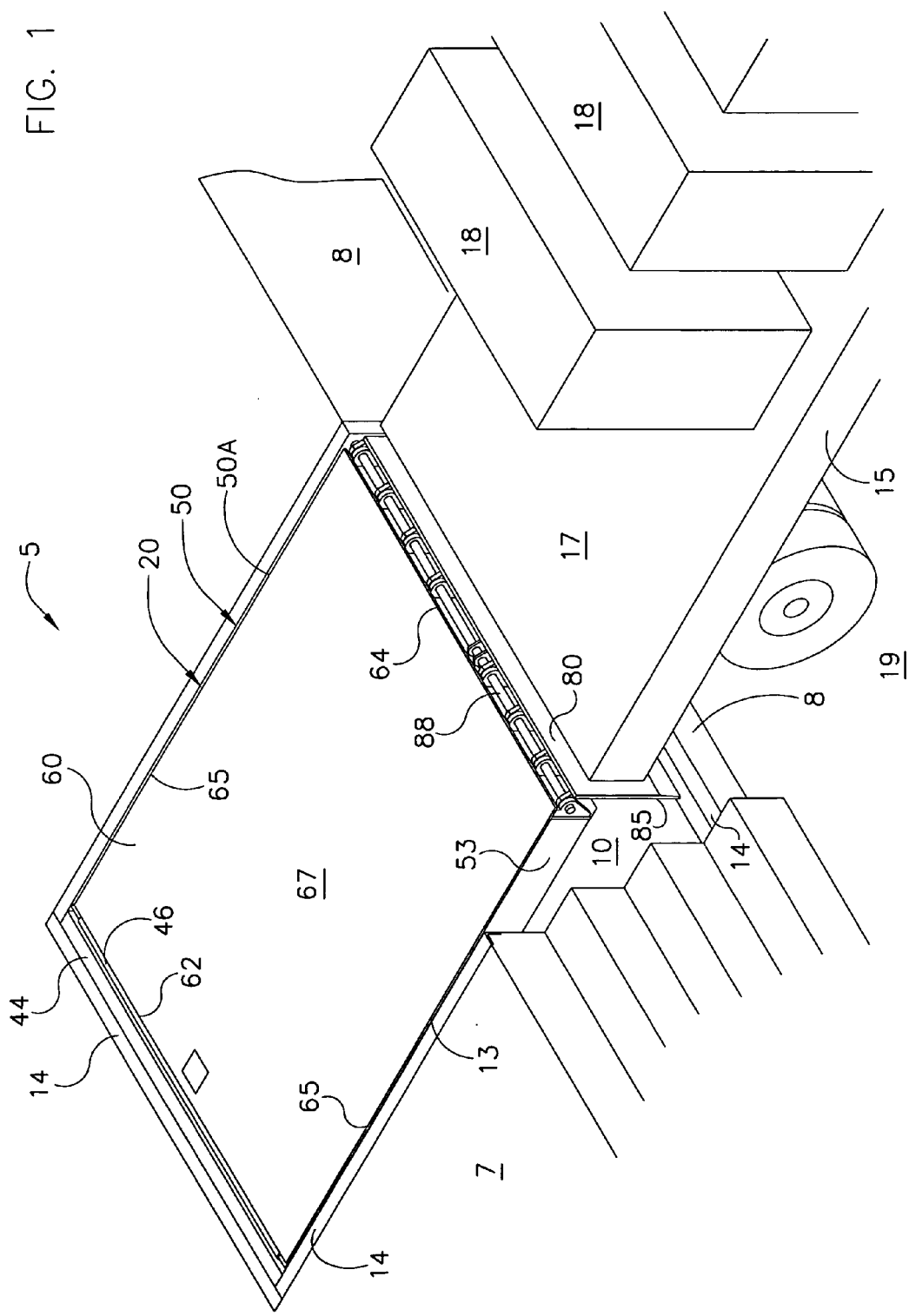
FIG. 1 is a prospective view showing the dock leveler installed in a pit of a loading dock with the leveler in its stored or cross traffic position with the upper surface of its deck even with the floor of the loading dock, and a loaded truck trailer backed up to the dock.

FIG. 1 shows a building or structure 4 with a loading dock 5. The loading dock 5 has a generally flat, horizontal, elevated floor surface 7 and a generally vertical front wall 8. The building 4 has a doorway 9 with an overhead door (not shown). The loading dock 5 has a pit 10 of sufficient depth to house a dock leveler. The pit 10 has a bottom floor or surface 11, a rear wall or surface 12, opposed sidewalls or surfaces 13, and an open front. The floor 11 is generally horizontal or slightly sloped for drainage, and is spaced down a desired distance from the floor 7 of the loading dock 5. Generally, the pit should be about ½ to 1 inch deeper than the dock leveler frame, discussed below, which is then shimmed to be level with the floor 7 and welded into place. The walls 12 and 13 are generally vertical or normal to the floor surfaces 7 and 11. Cast in steel angles 14 extend around the upper perimeter of the walls 12 and 13 of the pit 10. The top of the front wall 8 also has a cast in steel angle 14. Although not shown, an overhead door can be aligned over the present dock leveler invention or flush with the front wall 8 of the loading dock 5 without adversely affecting the operation of the dock leveler.

The loading dock 5 is designed to facilitate access to a truck trailer 15 or other carrier. The trailer 15 has a bed 17 upon which items 18 are placed for transport. The trailer bed 17 is spaced above the road or surface on which the trailer is traveling, and the floor 7 of the loading dock 5 is spaced a desired distance from its adjacent driveway or approach 19 so that a trailer bed 17 is somewhat near the level of the dock floor 7 when the rear end of the trailer 15 is backed up to the front of the dock. The floor 11 of the pit 10 is elevated a desired height above the driveway 19, but could be even with or lower than the driveway depending on the particular circumstance without departing from the broad aspects of the invention. The height of the trailer bed 17 relative to the dock floor 7 depends on a variety of factors that include the particular trailer 15 involved and the weight of the item or items 18 on the trailer 15. The trailer bed 17 rises and falls relative to the floor 7 as items 18 are placed on or removed from the trailer 15.

Figure 2:
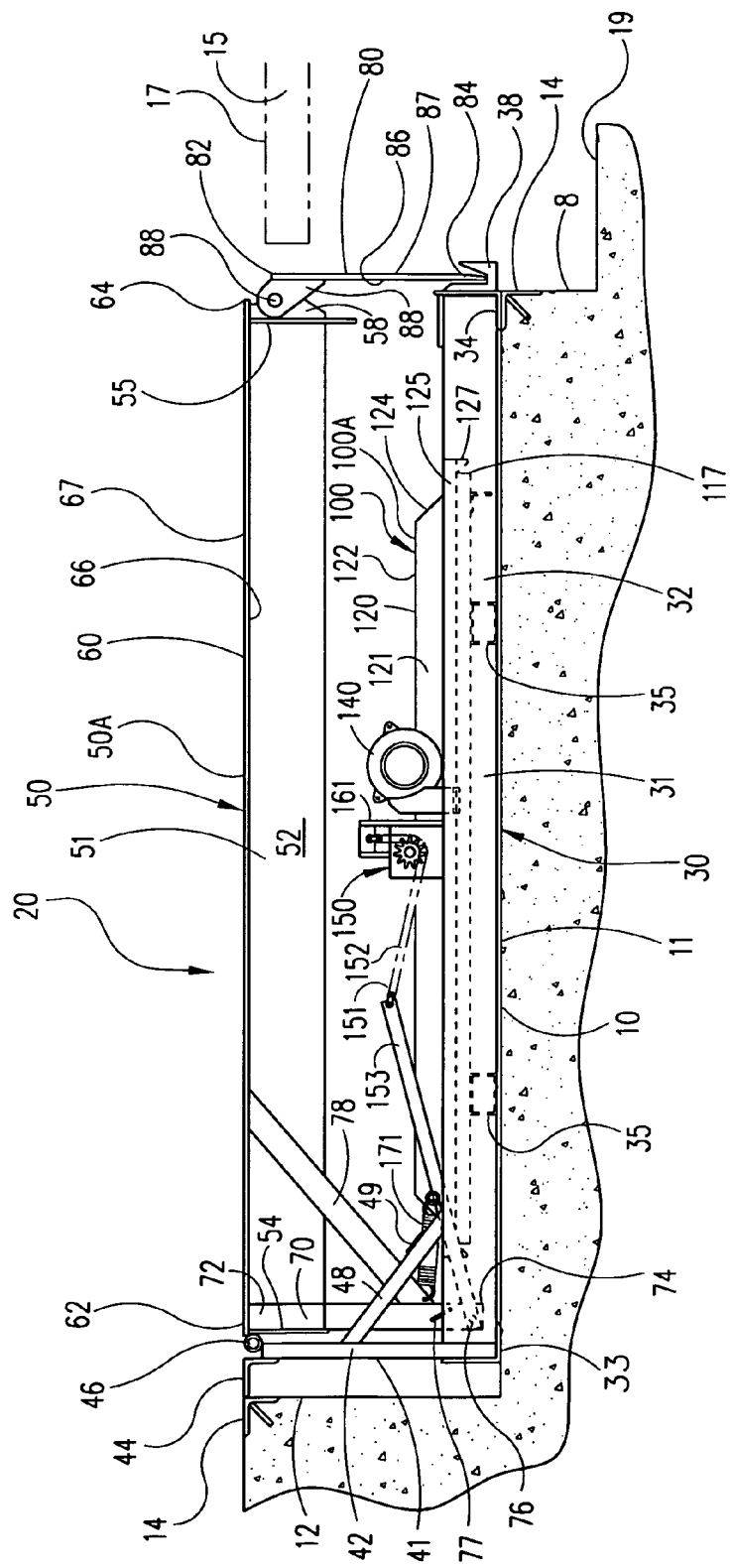
FIG. 2 is a side sectional view of the dock leveler in its stored position 50A showing the mounting frame anchored in the pit, the deck assembly hingably supported by the rear end of the mounting frame, the lip assembly in its pendent stored position with its lip nested in and supported by a lip support of the mounting frame, and the deck lift assembly in its retracted position 100A with its upper pan resting on its lower pan and its deflated bag located between them.
Figure 3:
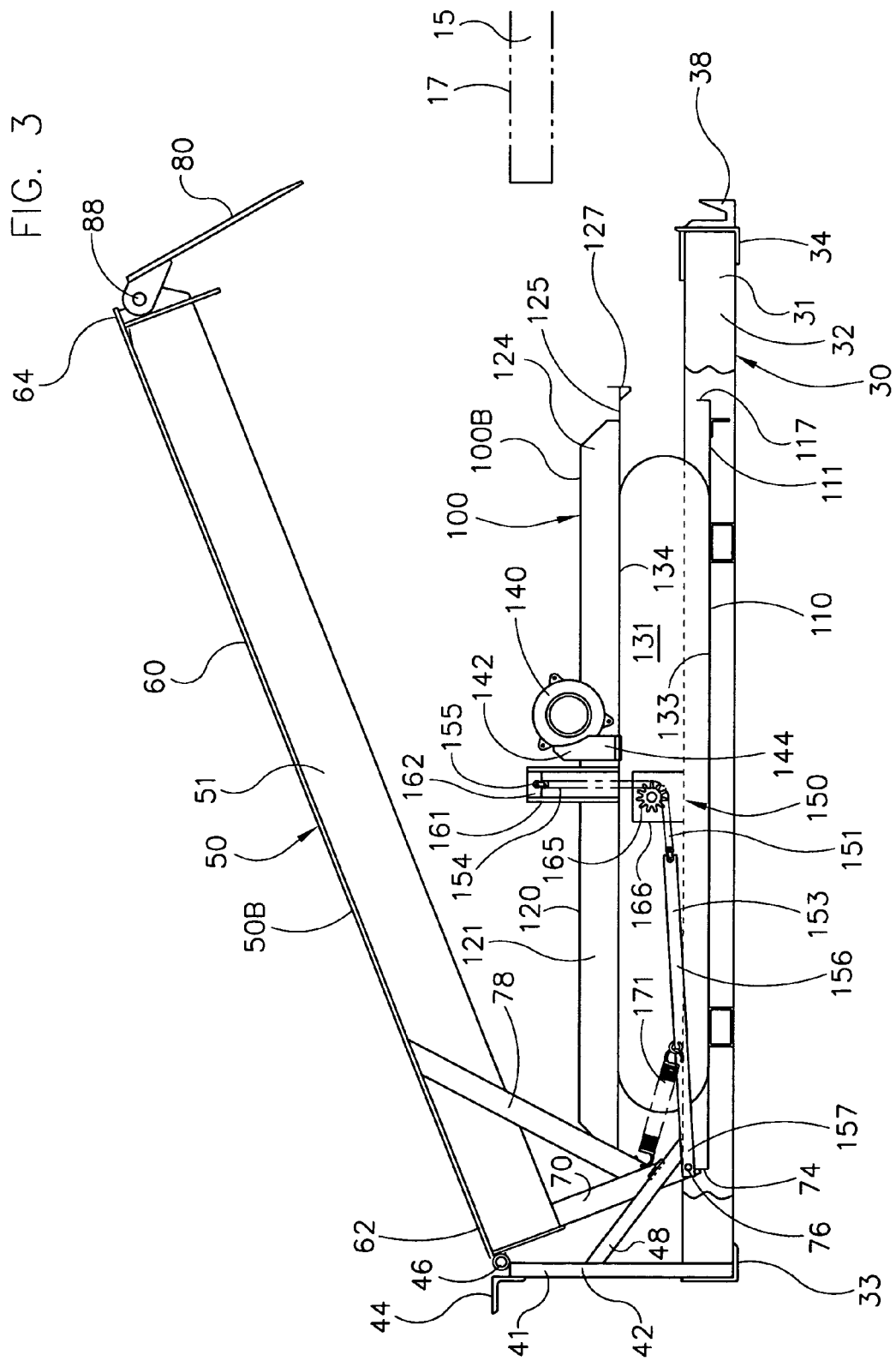
FIG. 3 is a side sectional view of the dock leveler in a fully raised position 50B with the deck assembly raised to a maximum incline position set by engaged limit stop plates, the lip in its pendent activated position ready for extension, and the deck lift assembly in its upper most extended position 100B with its bag inflated to raise the upper pan and mounting block of the tension assembly and causing its chain to pull the deck assembly to its raise position.
Figure 4:
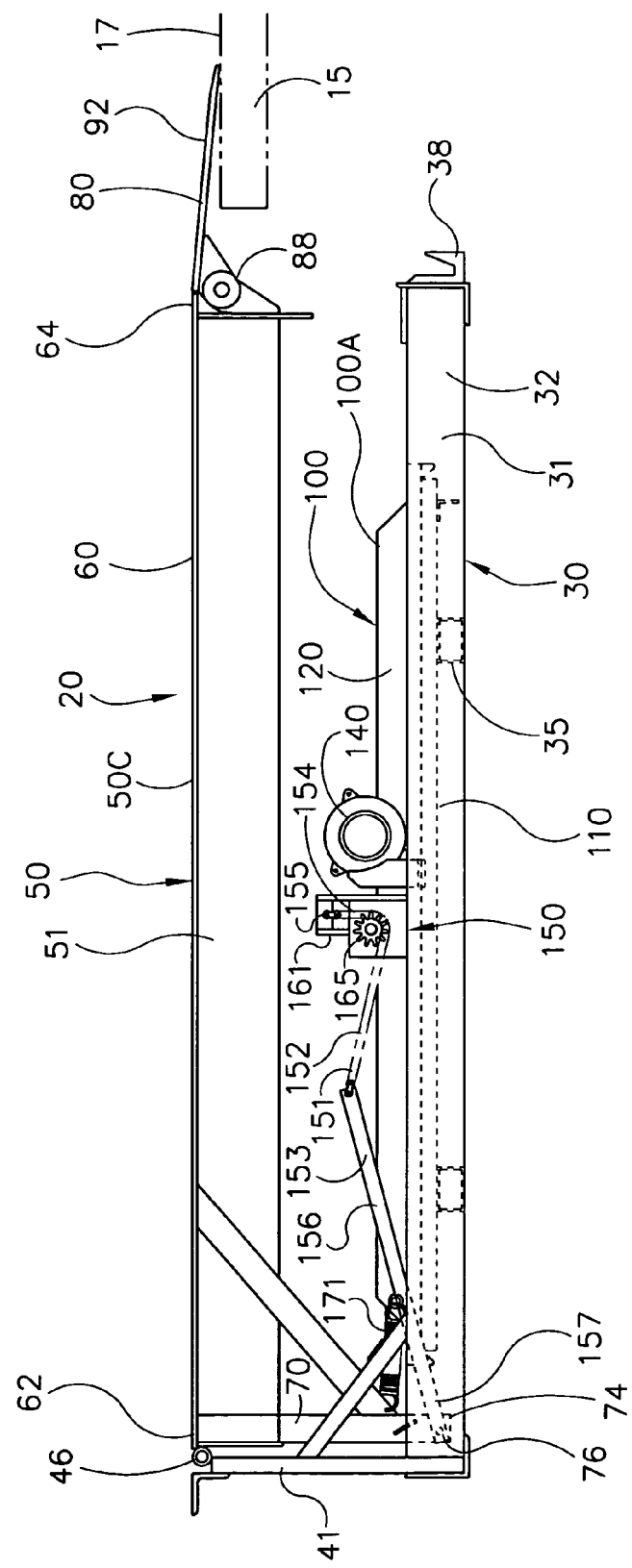
FIG. 4 is a side sectional view of the dock leveler in a trailer engaging position 50C with the deck assembly in a slightly upwardly inclined position with the lip engaging and resting on the bed of the trailer, and the deck lift assembly in its retracted position 100A with its upper pan resting on its lower pan and its deflated bag located between them.

The present invention relates to a dock leveler generally indicated by reference number 20 and shown in FIGS. 2–4. The dock leveler 20 has a variety of components including a mounting frame 30, a deck assembly 50 with an extendable lip 80, and air lift and deck lift assemblies 100 and 150. The components are robustly designed to support the weight of the deck assembly 50 and the loads it is intended to carry when fork lifts and the load items 18 travel over the leveler 20. The components are generally made of industrial grade steel or materials of similar strength and durability. The components can be painted, coated or otherwise treated to inhibit rust or corrosion.

The mounting frame assembly 30 is secured to the floor 11 and rear wall 12 of the pit 10. The frame 30 has front and rear ends, and includes a generally horizontal base frame or stationary platform 31 that is welded or otherwise rigidly anchored to the floor 11. The frame assembly 30 also includes a rear portion 41 that is anchored to the rear wall 12 at its top end. The base frame 31 spans the almost the entire length of the assembly 30, and includes two spaced apart, generally parallel side beams 32. The side beams 32 are rigidly joined by a rear and forward mounting angles 33 and 34. The rear angle 33 is located at the rear end of the base frame 31, which is spaced a few inches from the rear wall 12 of the pit 10. The base frame 31 also includes two forward mounting angles 34 located at its front end. The mounting angles 33 and 34 are rigidly anchored to the floor 11 of the pit 10. The mounting angle 34 is welded to the cast in steel angle located at the top of the front wall 8. The side beams 32 are welded, bolted or otherwise rigidly secured to the mounts 33 and 34. A pair of spaced cross beams 35 are welded or otherwise rigidly secured to the side beams 32 toward the mid section of the base 31. The beams 32 and 35 preferably have a rectangular cross-sectional shape, with the mounts 33 and 34 having an L-shaped cross-sectional shape. A conventional lip support 38 is rigidly secured or welded to the front angle 34 of the frame 31

The rear portion 41 of the frame 30 includes multiple, generally parallel riser beams 42. The risers 42 are preferably welded or otherwise rigidly secured to the rear end of the base frame 31, and are spaced a few inches from and are generally parallel to the vertical rear wall 12 of the pit 10. The risers 44 are joined together by an upper mounting angle 44 and the rear mount 33 of the base frame 31. Two risers 42 are aligned with the side beams 32. The bottom end of each riser 42 is rigidly secured to the rear end of its respective side beam 32 or to the rear mount 33. The mounting angle 44 is aligned against and anchored to one or both of the top of the rear wall 12 and the floor 7 of the loading dock 5. The risers 42 are rigidly secured to the upper mounting angle 44 to firmly support a fixed tubular hinge or pivot mount 46 for pivotally supporting the deck assembly 50. The mounting angle 44 of the frame 30 is welded to a cast in steel angle 14 in the building floor 7. At least one brace 48 joins the base frame 31 to at least one of the outer risers 42. At least one of the braces 48 includes an inwardly extending plate 49 to form a limit stop as discussed below.

The deck assembly 50 includes a support frame 51 and a deck 60. The deck assembly 50 and deck 60 are movable through a range of inclined positions between raised and lowered positions as discussed below. The frame 51 has a number of evenly spaced, parallel beams 52 and side plates 53 joined together by a rear plate 54 and a header plate 55. The front end of each beam 52 is welded or otherwise rigidly secured at evenly spaced increments to the inside or front surface of the rear plate 54, and the front end of each beam is welded or otherwise rigidly secured at the same evenly spaced increments to the inside or rear surface of the header plate 55. The top of the outside or rear surface of the rear plate 54 is firmly and pivotally secured to the hinge 46 at the top of the risers 42 of the support frame 30. The front surface of the header plate 55 has a first set of evenly spaced, parallel lugs. Each lug extends perpendicularly outward or forward from the front surface of the plate 55.

The deck 60 is preferably a sheet or plate of metal. The deck 60 has a predetermined length defined by its parallel rear and front ends 62 and 64. The rear end 62 is flushly aligned with the rear plate 54, and its front end 64 extends slightly beyond the header plate 55. The deck 60 has a predetermined width defined by its parallel side edges 65, each of which extends a slight distance beyond its corresponding side plate 53. The deck 60 has lower and upper surfaces 66 and 67. The lower surface 66 is welded or otherwise rigidly secured to the frame 51, and its upper surface 67 is generally flat and free and clear of obstructions. The upper end of the rear plate 54 is continuously welded to the lower surface 66 of the deck 60, and the upper end of the header plate 55 is continuously welded to the lower surface 66 from one side 65 and 57 of the deck and header plate to the other. The deck assembly 50 is pivotally secured to hinge 46 so that the upper surface 67 of the deck is parallel to the floor 7 of the deck 5 when the deck is in its home or parked position 50A as shown in FIG. 2.

The deck assembly 50 includes two lift arms 70 that help generate enough torque to lift the assembly. The lift arms 70 are located toward the rear hinged end 62 of the deck assembly. Each arm 70 is offset an equal distance from the lateral center of the deck 60 to a location proximal one side 65 of the deck. The upper end 72 of each lifting arm 70 is welded or otherwise rigidly secured to an outer support beam 52 and the rear header 54. The lifting arms 70 are robustly designed to maintain their shape and extend down from the deck assembly 50 in a generally perpendicular direction from the support frame 52 and deck 60. When the dock leveler 20 is in stored position 50A as in FIG. 2, the lift arms 70 are generally parallel to and spaced a few inches from the rear wall 12 with a lower end 74 located just above the floor 11. The lower end 74 of each lift arm 70 has a slot to pivotally receive a securement pin 76 for pulling the arm forward as discussed below. Each lift arm 70 forms the effective length of a torque arm defined by the linear distance between the rear hinge 46 and this pin 76. Each lift or torque arm 70 has a length slightly less than the height of the rear wall 12 of the pit 10.

Pulling the lower end 74 of the lift arms 70 forward causes the deck assembly 50 to pivot about its hinge 46 so that its front end 64 rises. At lease one lift arm 70 includes a sideward extending plate 77 that engages the sideward extending plate 49 of frame brace 48 to form an upper limit stop as best shown in FIG. 3. An angled stiffening brace 78 is provided to strengthen the lower end 74 of each arm 70 so that it remains in perpendicular alignment with the deck assembly 50 when pulled with enough force to lift the deck assembly 50. One end of the brace 78 is welded or otherwise rigidly secured to its lift arm 70 toward its lower end 74. The other end of the brace 78 is welded to the underside 66 of the deck 60.

The deck assembly 50 includes the extendable lip 80 with a generally rectangular shape. The lip 80 is hingably or otherwise pivotally secured to the header plate 55. The lip 80 has an inner or hinged end 82 and an outer or free end 84, side edges 85 that are aligned with the side edges 65 of the deck 60, and lower and upper surfaces 86 and 87. The upper surface 87 is slightly sloped toward the lower surface 86 near outer end 84. The lower surface 86 of the lip 80 has a number of substantially evenly spaced, parallel lugs located along its hinged inner end 82. Each lip lug is aligned to flushly engage one corresponding header lug. A pivot rod passes through each of the lugs to pivotally connect the lip 80 to the deck assembly 50. The lugs and pivot rod form a hinge 88 that joins the lip 80 to the deck assembly 50. The lip 80 is adapted to move between a pendant or hanging position 91 as in FIGS. 2 and 3, and a fully extended position 92 as in FIG. 4, including intermediate or partially extended positions. The lip 80 is biased into its hanging position 91 by its own weight. When in its hanging position 91, the lip 80 is generally parallel to the header plate 55. When the lip 80 is in its fully extended position 92, the rear surface of its hinged end 82 abuts the front or free end 64 of the deck 60, and the lip is angled slightly downward from the deck.

Figure 5:
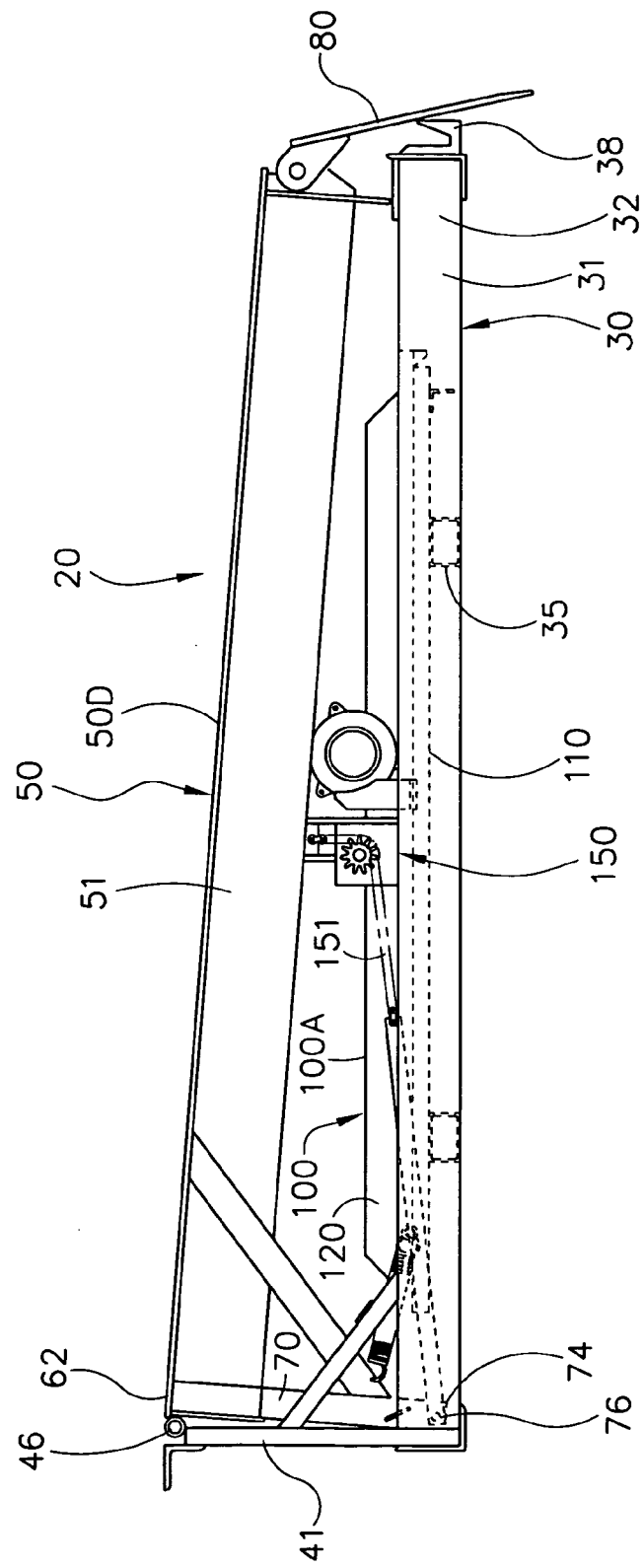
FIG. 5 is a side sectional view of the dock leveler in a lowest incline position 50D with the deck assembly in a slightly downward inclined position with its front end resting on the mounting frame, the lip in a pendant position and disengaged from its lip support, and the deck lift assembly in its retracted position 100A with its upper pan resting on its lower pan and its deflated bag located between them.
Figure 6:
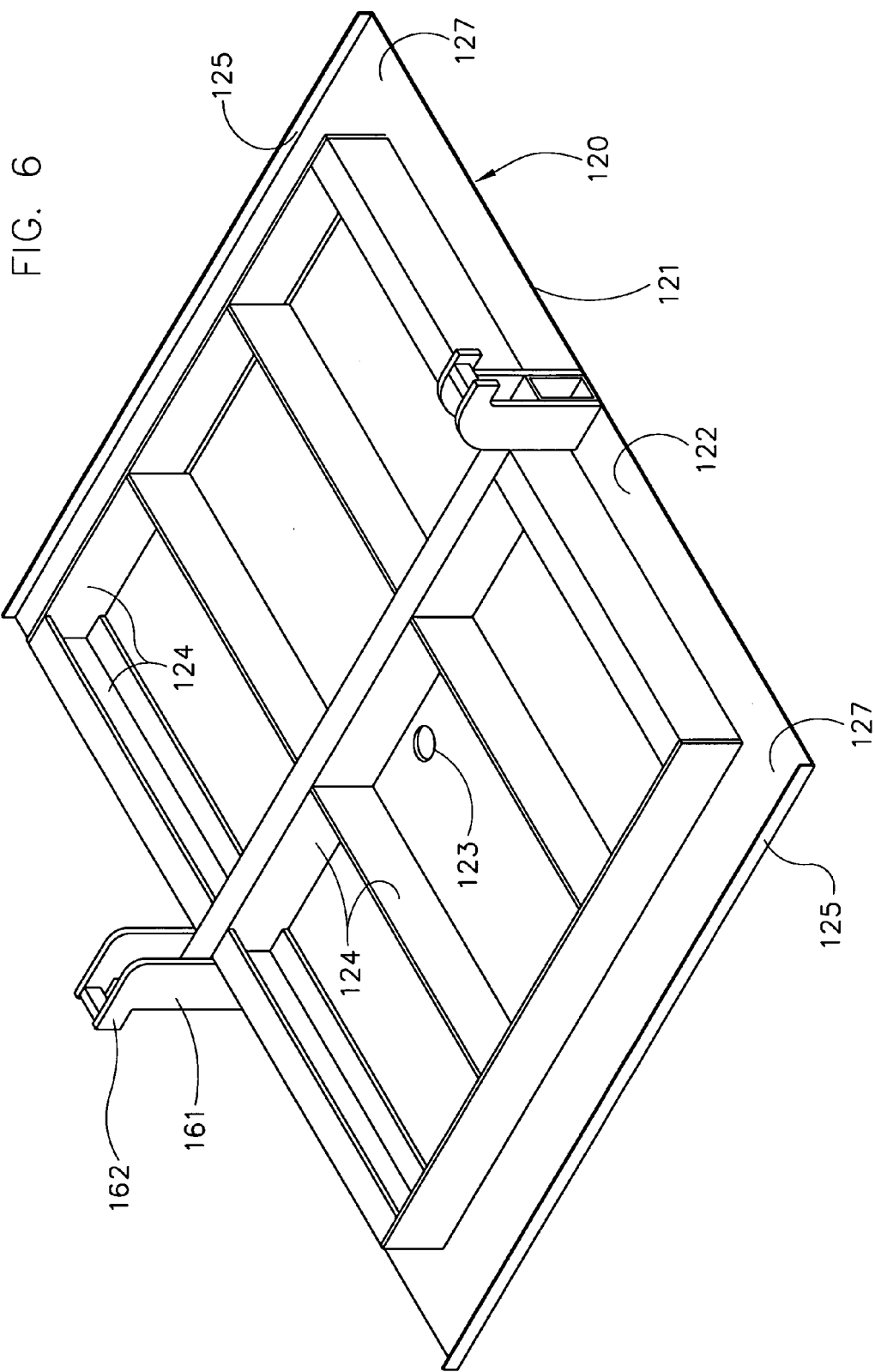
FIG. 6 is a side perspective view of the upper pan showing its support ribs and the mounting brackets of the tension assembly.

The dock leveler 20 includes air lift and deck lift assemblies 100 and 150 shown in FIGS. 2–5. The air lift assembly 100 is selectively movable between a retracted or at rest position 100A and an upper most extended operating position 100B. The air lift assembly 100 acts in combination with the deck lift assembly 150 to raise and lower the deck assembly 50 through a range of positions including a level stored position 50A, a raised inclined position 50B, an inclined trailer engaging position 50C and downwardly inclined position 50D. The deck assembly 50 pivots or rotates up and down about its rear hinge 46. FIG. 2 shows the deck assembly 50 in its stored or parked position 50A and the lift assemblies 100 and 150 in their retracted or deflated position 100A. FIG. 3 shows the deck assembly 50 in its raised position 50B and the lift assemblies 100 and 150 in their extended or inflated position 100B. FIG. 4 shows deck assembly 50 in its trailer engaging position 50C with its lip 80 resting on the bed 17 of the trailer 15, and the lift assemblies 100 and 150 in their retracted position. FIG. 5 shows the deck assembly 50 in it lowest position 50D with its front end 64 resting on the mounting frame.

The air lift assembly 100 has a lower stationary bag support 110 and an upper moving platform 120. Each includes or is formed by a pan or tray structure 111 or 121. Each pan 111 and 121 is formed from a continuous metal sheet that is robustly designed to maintain its shape. The lower or stationary pan 111 includes a flat, main portion 112 with upper and lower surfaces. The pan 111 rests on and is rigidly secured to the beams 32 and 35 of the base frame 31, so that its main portion 112 remains generally horizontal and stationary during the operation of the leveler 20. The pan 111 has an upwardly extending outer rim 117 to space it from the upper pan 121. The rim 117 preferably extends around its perimeter for strength, but could be limited to two opposed sides of the pan 111. Although the lower bag support 110 and upper platform 120 are shown and described to include or be formed by a continuous pan 111 or 121, it should be understood that they can be formed by other structures, such as with openings, provided the structure does not promote tearing, frictional wear, or accelerated deterioration of the inflatable bag 130.

The pan 121 of the upper platform 120 includes a horizontally flat, main portion 122 with upper and lower surfaces. During the operation of the lift assembly 100, the main portion 121 of the upper pan 120 remains in substantially parallel alignment with the main portion 111 of the lower pan 110. The main portion 121 also remains substantially centrally aligned over or directly above the main portion 111 of the lower pan 110. The upper pan 120 does not significantly shift longitudinally or laterally relative to the lower pan 110 when at rest or during operation. The upper pan 121 has a generally flat main portion 122 with an opening 123 as discussed below. The platform 120 has an upwardly extending reinforcing structure formed by several integrally joined, lateral and longitudinal ribs 124. The pan 120 has outer rims 125 along its forward and rear ends for added strength, and outer margins 127 that extend beyond the rim 117 of lower pan 110. When the lift assembly 100 is in its retracted position 100A, the upper end of the rim 117 of the lower pan 111 engages the outer margins 127 of the upper pan 121 so that the upper platform 120 rests on and is fully supported by the lower bag support 110.

Both pans 111 and 121 have a generally rectangular shape when viewed from above. The bag support pan 111 remains nested between the support beams 52 of the base frame 31, and the platform pan 121 nests between these beams 52 when the air lift assembly 100 is in its retracted position 100A. This nesting structure helps minimizes the height of the leveler 20 when in its stored position 50A, the necessary depth of the pit 10, and allows the leveler to achieve a downward incline position 50D. The length and width of the pans 111 and 121 and bag 130 are a function of the length and width of the pit 10, as well as the weight of the deck and lip assemblies 50 and 80. The pans 111 and 121 and bag 130 generally have a front-to-rear length of about ½ to ¾ the length of the pit 10, and preferably about ⅔ the length of the pit. Similarly, the pans 111 and 121 and bag 130 generally have a width of about ½ to ¾ the width of the pit 10, and preferably about ⅔ the width of the pit. Still, the size of the pans 111 and 121 and bag 130 are contingent on available space and the amount of force required to raise the leveler 20. The dimensions of the pans and bag will change with different models of dock levelers 20 dependent on the length, capacity, service range and frame depth of the leveler. The pan 111 and 121 and bag 130 both have a width of about four feet to provide a desired amount of lateral stability. The lengths of the pans 111 and 121 and bag 130 will change as discussed above, but will have a minimum length of four feet for longitudinal stability. The length and width dimensions of the pans and bag provides a sufficient footprint to distribute the load generated to raise the deck assembly and its lip 80, and help maintain the stability of the lift assembly 100 and keep the upper pan 121 in generally horizontal and centered alignment over the lower pan 111 during operation.

The inflatable bag 130 preferably has a single chamber 131 as best shown in FIG. 3. The bag 130 is selectively inflated and deflated during operation. The bag 130 is positioned between the support 110 and platform 120 and their respective pans 111 and 121 in a nested or sandwich configuration. Like the pans 111 and 121, the bag 130 has a generally square or rectangular shape when viewed from above. The bag 130 is structured to retain this rectangular shape when being inflated or deflated, so that its shape corresponds with the shape of the pans 111 and 121 when inflated and deflated. When deflated, the bag 130 lays substantially flat on the support pan 111 and has a width of about four feet or equal to the width of the pans, and a length about equal to the length of the pans 111 and 121, which depends on the capacity of the leveler and is generally about two feet less than the length of the pit 10. The outer margins or edges 132 of the bag 130 remain clear from and are not pinched between the rim 117 of the lower pan 111 and the outer margins 127 of the upper pan 121. A lower wall 133 of the bag 130 engages the lower pan 111. An upper wall 134 of the bag engages the upper platform 121. Although the bag 130 is shown and described as forming a single expandable chamber, it should be understood that the broad aspects of the invention are not limited to a bag with a single chamber and encompass the use of a bag with multiple expandable chambers or several stacked bags.

The bag 130 has a skin made of 22 ounce per square yard standard reinforced vinyl or other suitable materials, and has a normal operating pressure in the range of about 2 to 3 psi above ambient room pressure, and a life expectancy of at least 100,000 inflation cycles. The bag 130 is formed from a single reinforced vinyl sheet 135 cut into a generally rectangular pattern having opposed parallel side edges as shown in FIG. 7. The sheet 135 includes a central section and two side sections 135a–c. The central section 135a has a length that is slightly less than twice the length of each individual side section 135b and 135c. The central section 135a includes two outer lap portions 136 so that its width is slightly larger than the two side sections 135b and 135c. The side sections 135b and 135c have substantially the same width. A small slit 137a is cut into each of the four corners of the central section 135a, and an air inlet hole 137b is cut toward the center of the central section 135a. The side sections 135b and 135c are then folded over the central section 135a as shown in FIG. 8. The outer edges of the side sections 135b and 135c overlap to form a central lateral overlap area. The overlapping portions of side sections 135b and 135c lay in a flush parallel alignment, without a knick, so that the hoop or tension stresses in the bag are smoothly transmitted from one section 135b to the other 135c without causing the seam to tear apart. The overlapping portions of side sections 135b and 135c forming this overlap area are integrally joined via a continuous radio frequency (RF) weld to form a central lateral seam 138. An insulator (not shown) is placed between the overlap area and the central section 135a when forming the central seam 138 so that the seam is not bonded to the central section. The joined side sections 135b and 135c form the lower wall 133 of the bag 130, and the central section 135a forms its upper wall 134.

A pair of opposed side seams 139 are formed after the central seam 138 is formed. A conventional, aluminum insulator bar (not shown) is placed along the side of the partially formed bag 130 before each side seam is formed. The insulator bar extends along the full length of the respective side of the bag, from one slit to the other. The outer lap portion 136 is then folded over the side sections 135b and 135c. The insulator ensures that only the lap section 136 is welded to the second layer 133, and not the underlying portion of the central section 135a forming the first layer 134 of the bag. Lap portions 136 of the central section 135a are then folded over the side sections 135b and 135c to form opposed side overlap areas as shown in FIG. 9. As with the central seam 138, the overlapping portion of outer lap portion 136 lays in a flush parallel alignment, without a knick, against the side sections 135b and 135c so that the hoop or tension stresses in the bag are smoothly transmitted from sections 135b and 135c to the other portion 136 without causing the seam 139 to tear apart when the bag is inflated. This flush overlapping seam construction provides maximum strength. Each overlap portion 136 is then integrally joined to the lower wall 134 formed by side sections 135b and 135c via a continuous RF weld to form longitudinal side seams 139. After welding the side seams 139, the insulator is removed by pulling it out through one of the remaining openings in the four corners created by slits 137a. After the insulator bars are removed via the slits 137a, the openings in the four corners of the bag 130 due to the slits are welded closed to complete the sealed chamber 131.

When the bag 130 is placed between the upper and lower pans 111 and 121, the central seam 138 spans laterally, from a location near one side of the pans to the other side. The side seams 139 span longitudinally along the length of the pans 111 and 121, from a location near the rear end of the pans to the front end of the pans. When deflated, the bag 130 lays generally flat on the lower support pan 111. When inflated, the bag 130 has a generally pillow or pancake shape as in FIG. 3. The lower wall 133 of the bag 130 conforms to and presses against the flat upper surface of the horizontal, main portion 112 of the lower pan 111. The upper wall 134 conforms to and presses against the flat lower surface of the horizontal, main portion 122 of the upper pan 121. The inflated height of the bag 130 can vary depending on the depth of the pit 10 and height of the leveler frame 30. Longer units 20 may require more travel. The air inlet opening 137b in the upper wall 134 of the bag 130 has a diameter of about three inches. This opening 137b is centrally located in the upper wall 134 to receive a conventional plastic hollow center, flanged fastener including lock nut (not shown). The flange of the bolt shaped hollow fastener is located on the inside of the bag 134 and feeds through the bag opening 137b and through the central opening 123 in the upper pan 121. The lock nut mates with and tightens to the bolt on the top of the pan 121 to join the bag 130 to the pan and help keep them in mutual alignment. The hollow flanged bolt forms an intake opening of about 1.5 inches through which air passes into and out of the chamber 131 of the bag 130 to inflate and deflate the bag, respectively. The flange bolt receives a rubber washer between the upper pan 121 and upper wall 134 to space them apart and reduce friction, avoid crushing the bag and maintain a secure connection.

An air supply unit or blower unit 140 selectively inflates the bag 130 with air taken from the surrounding ambient air, such as the air in the loading dock building. The blower unit 140 is mounted on the upper platform 120, and is connected to the bag 130 so that it is in air flow communication with chamber 131. The blower 140 pushes air out its exhaust port 142 and through a conventional supply tube 144. The supply tube 144 passes through the central opening 123 of the plate 122 of the upper platform 120 and through the intake opening in the upper wall 134 of the bag 130, so that the supply air passes into the chamber 131 to inflate the bag 130.

The blower unit 140 is powered by an electric motor. The blower motor is selectively turned on and off by a toggle switch located at a safe and accessible location of the loading dock 5. The blower motor has a power of about 1350 watts. The blower 140 pushes about 100 cfm of supply air, and inflates the bag 130 to a pressure range of about 2 to 3 psi depending on the size and weight of dock leveler 20. The bag 130 automatically begins to deflate when the blower 140 is turned off. The pressurized air in the bag 130 is pushed out of chamber 131 due to the weight of the deck assembly 50 and upper platform 120. Air is discharged from the chamber 131 through the supply tube and exhaust port 142 of the blower 140, which remain open to air flow. Although not shown, an electrically operated safety valve can be fit between the blower 140 and the bag 130 to allow the operator to quickly stop the movement of the deck during operation. An emergency stop button is pushed to close the shut off valve, stop air flow into and out of bag 130, and arrest or stop the movement of the deck as it is being raised or lowered.

A pair of deck lift assemblies 150 work in conjunction with the air lift assembly 100 to raise and lower the deck assembly 50. The deck lift assemblies 150 are located on opposed lateral sides of the upper platform 120. Each assembly 150 includes a flexible pull line or pull unit 151 formed by a flexible member such as a chain 152, and preferably includes a rigid member such as an elongated steel rod 153. One end of each chain 152 is secured to one end of its corresponding rod 153. Each pull line 151 has a predetermined length and pulls about half the load to lift the deck assembly 50. Each pull line 151 has a substantially vertical portion 154 with an upper end 155 secured to a mounting block 161 on the upper pan 120, and a substantially horizontal portion 156 with an opposed lower end 157 secured to the lift or pull arm 70 of the deck assembly 50. Although the pull lines 151 are shown and described to be separate lines, it should be understood that the pull unit or pulling mechanism can take various forms. For example, the pull lines could be joined at one end 155 or 157 to form a partial loop or at both ends to form a continuous loop.

Each mounting block 161 is rigidly secured or welded to one side of the moving platform 120. Each block 161 is substantially longitudinally centered between the front and rear ends of the platform 120, and has a cantilevered portion 162 that extends laterally outward beyond its respective side edge of the pan 121. The upper end 155 of the pull line 151 is securely fastened to the cantilevered portion 162 of its corresponding mounting block 161, so that the pull line moves in unison with the mounting block 161 and upper pan 120. The lower end 157 of each pull line 151 is securely and pivotally pinned to the lower end 74 of its corresponding deck lift arm 70, so that the deck lift arm also moves in unison with the pull line and upper pan 120. As the upper platform 120 rises, the pull line 151 pulls the deck lift arm 70 forward, which cause the deck assembly 50 to pivot about its rear hinge 46, move to an incline position, and elevate its front end 64.

The upper portion 154 of each chain 152 extends down from the mounting block 161 of the upper platform 120 in a substantially vertical direction and into mating engagement with a corresponding sprocket or pulley 165. Thus, the load exerted on the upper platform 120 by the pull line 151 is vertically downward along the longitudinal center line of the upper pan 121 and air bag 130. Each sprocket 165 is rotatably mounted on a corresponding mounting block 166 that is welded to the side beam 32 on its corresponding side of the base frame 31. The chain 152 enters the sprocket 165 vertically from above, and exits the sprocket substantially horizontally as it extends rearwardly toward the deck lift arm 70. Thus, the load exerted on each deck pull arm 70 by its pull line 151 is substantially horizontally forward, or normal to its deck pull arm. Each chain 152 is securely joined to its corresponding tension rod 153, which extends rearwardly toward the lift arm 70. The chain 152 and tension rod 153 combine to form the pull line 151 having a desired length to keep the chain 152 taught throughout the full range of positions 100A–B of the air lift assembly 100. The spaced blocks 161 and 166 and pull lines 151 on opposed sides of the bag 130, the central location of the sprockets 165 and vertical portion 154 of the pull lines relative to the length of the pans 111 and 121, the force of the bag 130 on the pans, and the flange connection joining the bag to the upper pan 121 all help keep the bag and pans in stable alignment.

To maximize the transmitted lifting power of the deck lift assembly 150, the lower portion 156 of each pull line 151 is kept in a substantially perpendicular alignment to the torque arm formed between hinge 46 and pin 76. In this embodiment, the torque arm is effectively the length of the lift arm 70. The substantially perpendicular or normal alignment is preferably within the angular range of about 20° of normal relative to the torque or lift arm 70 as it rotates about hinge 46. Several design features help maintain this substantially normal alignment to maximize the transmitted lifting power of the lift assembly 150. The pins 76 of the lift arms 70 are located toward the rear of the frame 30 to increase the distance between the pins and their respective sprockets 165. The sprockets 165 are also elevated above the pins 76 when the deck assembly 50 is in its stored position 50A as in FIG. 2. When the assembly 50 is in this stored position 50A and the lift assembly 100 and upper pan 120 are partially raised so that the pull line 151 is taught, the lower portion 156 of the pull line 151 should be within an angle of about 10° from normal relative to the torque arm or lift arm 70. However, it should be understood that this angle varies with the length of the deck 60 and the height of the pit 10.

As the lift arm 70 pivots forward and the deck assembly 50 is raised toward its fully raised position 50B as in FIG. 3, the lower end 74 of the lift arm rises to a location just below horizontal alignment with the sprocket 165. When the deck assembly 50 and lift arm 70 are in this fully raised position 50B, the lower portion 156 of the pull line 151 should be within an angle of about 25° from normal relative to the torque arm or lift arm 70, and are typically about 15° to 20°. However, it should be understood that this angle varies with the length of the deck 60, the height of the frame 10, and the service range of the leveler 20. The shorter the deck 60 and the higher the service range, the greater this angle will be. Yet, less torque is typically needed to raise a shorter and lighter deck. The substantially normal alignment between the torque arm and lower portion 156 of the pull line 151 is particularly important when the deck 50 approaches its fully incline position 50B as in FIG. 3. This is because the outer periphery 132 of the bag 130 tends to pull away from the generally flat portion 122 of the upper pan 121 when the bag is inflated. The reduction in engaged surface area between the bag 130 and the upper pan 120 reduces the power of the lift mechanism 100.

Each deck lift assembly 150 includes a tension mechanism 171 such as a spring. The tension mechanism 171 maintains its pull line 151 and chain 152 in a taught condition when in the deflated position 100A so that the chain 152 remains firmly engaged with its sprocket 165. One end of the tension mechanism 171 is secured to a mid-section of the tension rod 153. The other end of the tension spring 171 is secured to the brace 78 of the deck assembly 60 at a location above the pin 76, and rod end 156 of the pull line or unit 151. When the lift assembly 100 is in its retracted position 100A and the deck assembly is in its stored position 50A as in FIG. 2, the tension spring 171 pulls the tension rod 153 upward to gather in any slack in chain 152 and maintain the chain in taught engagement with the sprocket 165. During operation when the air bag 130 is inflated or being inflated to raise the lift assembly 100 to its extended position 100B as in FIG. 3, the chain 152 pulls on the tension rod 153 with sufficient force to pivot the rod down about pin 76 and move the rod into linear alignment with the teeth of sprocket 165. The tension spring 171 is set so that the pull line 151 remains taught when the lift assembly 100 is in its retracted position 100A and the deck assembly 50 remains in a raise engaged position such as position 50C in FIG. 4.

The dock leveler 20 includes a conventional lip extension mechanism such as extension mechanism 200 in U.S. Pat. No. 6,834,409, the content of which is incorporated by reference. When the dock leveler 20 is in its raised position 50B (FIG. 3), the lip extension mechanism 200 is engaged. When the blower unit 140 is turned off and the deck assembly 50 begins to drop down under its own weight as the bag 130 deflates, the lip extension mechanism 200 rotates the lip 80 from its hanging or pendant position 91 as in FIG. 3 to its extended position 92 as in FIG. 4.

The dock leveler is normally kept in its stored or home position 50A where the surface 67 of the deck 60 is flush or level with the floor 7 of the dock 5 so workers can walk crosswise over the deck 60 without tripping. The free end 64 of the deck assembly 50 is supported by the lip 80 which is resting in the lip support 38 as in FIG. 2. The lift assembly is in its retracted position 100A. When a trailer 15 backs up to the dock 5 to be loaded or unloaded, the dock leveler 20 is used to form a bridge between the floor 7 and trailer bed 17. The dock leveler 20 is activated by turning on the blower unit 140, which causes the bag 130 to inflate so that its upper wall 134 and the upper platform 120 rise in a substantially vertical direction. The main portion 122 of the platform 120 remains substantially horizontal as it rises. The platform 120 pulls the chain 152 of the pull line 151 up with it. The horizontal portion of the chain 152 moves forward toward and passes through the sprocket 165, which draws the lower end 74 of the deck pull arm 70 forward, as shown in FIG. 3. The forward rotating movement of the deck lift arm 70 causes the deck assembly 50 to rotate or pivot in a counterclockwise direction about rear hinge 46, which causes the deck assembly to incline and raise its front end 64. The lip 80 remains hanging in a pendant position 91.

With the blower 140 running, the deck and lift assemblies 50 and 100 continue to rise to their fully raised and extended positions 50B and 100B where the limit stop plates 49 and 77 engage as in FIG. 3. The blower 140 should remain running until the deck assembly 50 reaches its fully raised position 50B or at least passes a preset inclined position that is sufficiently high to activate the lip extension mechanism. When the deck assembly 50 passes the preset inclined position or reaches the fully incline position 50B, the blower unit 140 is manually turned off. As the bag 130 begins to deflate and the platform 120 and deck assembly 50 begins to drop down at a controlled rate, the lip extension mechanism is activated to swing the lip 80 out to its extended position 92. The deck and lift assemblies 50 and 100 continue to drop at a controlled rate until the extended lip 80 engages the trailer bed 17 as in FIG. 4. The front end 64 of the deck assembly 50 is now supported by the trailer bed 17, but the lift assembly 100 continues to drop down until it reaches its retracted position 100A. Slack in the pull line 151 is taken up by the tension spring 171. The lip 80 and front end 64 of the deck assembly 50 are now floatingly supported by the trailer bed 17, and rise or fall with the trailer bed as items 18 are unloaded from or loaded onto the trailer bed. The deck assembly 50 remains floatingly supported by the trailer bed 17 unless the loading process pushes the suspension of the trailer bed 17 down so much that the deck 60 reaches its lowest incline position 50D with its front end 64 resting on the frame 30.

The dock leveler 20 is removed from engagement with the trailer bed 17 by activating the blower 140 to raise the deck and lift assemblies 50 and 100 to a partially raised or incline position in much the same manner described above. As the deck 60 is raised, the lip 80 swings down into its pendent position 91. The lift assembly 100 should only be raised enough to support the deck assembly 50 via the pull line 151 and disengage the lip 80 from the trailer bed 17. The deck and lift assemblies 50 and 100 need not be raised to their fully inclined and extended positions 50B and 100B so that the lip extension mechanism is not activated. With the lip 80 hanging in its pendent position 91, the blower 140 is turned off and the deck and lift assemblies 50 and 100 drop down at a controlled rate until the lip 80 engages the lip support 38. The deck assembly 50 comes to a stop at its home position 50A as its front end 64 now supported by the lip support 38. The lift assembly 100 continues to drop at a controlled rate until it returns to its stored position 100A where the outer margins 125 of the upper pan 120 come to rest on the rim 117 of the lower pan 110 as in FIG. 2. Should the lip 80 fail to engage the lip support 38, the deck assembly 50 will only drop down to the lowest incline position 50D shown in FIG. 5.

Routine maintenance of the dock leveler 20 is provided by raising the deck assembly 50 to allow access to its various components. The blower 140 is activated to raise the deck and lift assemblies 50 and 100 to their fully raised and extended positions 50B and 100B as in FIG. 3. A prop (not shown) is then inserted to maintain the deck assembly 50 in this raised position 50B. The blower 140 can remain on to allow access to certain components such as the inflatable bag 130 and the insides of the pans 111 and 121. The blower 140 can also be turned off, so that the lift assembly 100 returns to its retracted position 100A, to allow access to other components. When servicing is complete, the blower 140 is activated so that the lift assembly 100 again supports the deck assembly 50. The prop is then removed, and the blower 140 deactivated to allow the leveler 20 to return to its stored position 50A and 100A.

While the invention has been described with reference to preferred embodiments, it will be understood by those skilled in the art that various changes may be made and equivalents may be substituted without departing from the broader aspects of the invention.

I claim:

1. A dock leveler for forming a bridge between a floor of a loading dock and a trailer, said dock leveler comprising:
   a deck assembly including a deck, a rear hinged end, a front end, a lip and a deck lift arm, said deck lift arm being secured to and extending downwardly from said deck assembly proximal said rear hinged end, said deck lift arm having a lower end downwardly spaced from said hinged end, said deck being pivotally secured at said rear hinged end, and lip being pivotally secured to said front end, and said deck assembly being movable through a range of inclined positions between raised and lowered positions;
   an air lift assembly including an inflatable bag, an air supply unit, a bag support and a drive platform, said bag forming an expandable chamber positioned between said bag support and said drive platform, said air supply unit having an exhaust port in air delivering communication with said bag and being selectively activated to supply air to said chamber and inflate said bag, said drive platform being movable from a retracted position when said bag is in a collapsed condition to an extended position when said bag is in said inflated condition, said drive platform remaining substantially horizontal and aligned directly above said bag support, and said air lift assembly being biased toward said retracted position when said air supply unit is deactivated;
   a deck lift assembly including a pull line engaged with said drive platform and said lower end of said deck lift arm; and,
   wherein activating said air supply unit inflates said bag, pushes said drive platform and pull line upward, draws said lower end of said lift arm forward, and pivots said deck assembly toward said raised position.

2. The dock leveler of claim 1, and wherein said inflatable bag has lower and upper bag walls, said bag support has a substantially horizontal surface that engages said lower bag wall, and said drive platform has a substantially horizontal surface that rests on and rises with said upper bag wall.

3. The dock leveler of claim 2, and wherein said bag support forms an upwardly facing pan with a flat interior portion, said drive platform forms a downwardly facing pan with a flat interior portion, and said bag support supportingly engages said drive platform when in its said retracted position.

4. The dock leveler of claim 2, and wherein said bag support, drive platform and bag each have a predetermined length and a predetermined width, said predetermined lengths of said bag support, drive platform and bag are substantially equal, and said predetermined widths of said bag support, drive platform and bag are substantially equal.

5. The dock leveler of claim 4, and wherein the loading dock has a pit with a given longitudinal length and a given lateral width, said substantially equal predetermined lengths of said bag support, drive platform and bag are in the range of about ½ to ¾ the longitudinal length of the pit, and said substantially equal predetermined widths of said bag support, drive platform and bag are in the range of about ½ to ¾ the lateral width of the pit.

6. The dock leveler of claim 5, and wherein said substantially equal predetermined lengths of said bag support, drive platform and bag are about ⅔ the longitudinal length of the pit, and said substantially equal predetermined widths of said bag support, drive platform and bag are about ⅔ the lateral width of the pit.

7. The dock leveler of claim 5, and further including a frame anchored in the pit of the loading dock, said hinged end of said deck assembly being pivotally secured to said frame, and said bag support being fixed to and supported by said frame.

8. The dock leveler of claim 1, and wherein said deck and said air lift assembly have opposed lateral sides, said deck assembly includes a pair of deck lift arms, and said deck lift assembly includes a pair of pull lines, each pull line being located along one of said opposed lateral sides, and each pull line being spaced outwardly from said inflatable bag on its respective opposed lateral side.

9. The dock leveler of claim 8, and wherein said first end of each of said pull lines is secured to said drive platform at a location proximal its longitudinal center.

10. The dock leveler of claim 9, and wherein each of said pull lines has a predetermined length and first and second ends, said first end being rigidly secured to said drive platform and said second end being rigidly secured to said lower end of its said deck lift arm.

11. The dock leveler of claim 10, and wherein each pull line includes a chain and a cooperating sprocket, each chain extending substantially vertically down from said drive platform into mating engagement with its said sprocket, and each said pull line extending substantially horizontally from its said sprocket toward its said deck lift arm.

12. The dock leveler of claim 11, and wherein said pull line has a lower portion joined to said lower end of said deck lift arm by a pin, and said deck assembly forming a torque arm between said rear hinge and said pin, said sprocket and said lower end of said deck lift arm being positioned to maintain said lower portion of said pull line within an angular range of about 20° of normal relative to said torque arm.

13. The dock leveler of claim 10, and wherein each deck drive assembly includes a mounting block secured to and extending upward from said drive platform, each of said mounting blocks including an outwardly extending cantilevered arm, and each lift arm having its first end secured to said cantilevered arm of its said mounting block.

14. The dock leveler of claim 1, and wherein said lip of said deck assembly is supported by a lip support when said deck assembly is in a stored position, said air lift assembly dropping down out of supporting engagement with said deck assembly to said retracted position when said deck assembly is in said stored position, and said deck lift assembly including a tension spring to take in slack of said pull line.

15. The dock leveler of claim 7, and wherein said deck assembly is movable to a lowest incline position, said front end of said deck assembly resting on said frame when in a lowest incline position.

16. The dock leveler of claim 7, and wherein said deck lift arm has a limit stop plate, said limit stop plate engaging said frame to form an upper stop limit for said deck assembly.

17. The dock leveler of claim 1, and wherein said inflatable bag forms a single expandable chamber.

18. The dock leveler of claim 17, and wherein said inflatable bag is formed from a single sheet of material, said single sheet of material being folded and seamed together to form said bag, said bag having a central seam and opposed side seams, and each of said seams being formed by layers joined in flush parallel alignment.

19. The dock leveler of claim 18, and wherein said central seam spans between opposed lateral sides of said bag support, and said side seams span along their respective lateral side of said bag support.

20. The dock leveler of claim 19, and wherein said inflatable bag is made from a single sheet of reinforced vinyl.

* * * * *